United States Patent
Desai et al.

(10) Patent No.: US 8,942,329 B2
(45) Date of Patent: Jan. 27, 2015

(54) FAST AND RELIABLE CHANNEL CLASSIFICATION ALGORITHMS IN BLUETOOTH NETWORKS TO DETECT AND AVOID 2.4 GHZ INTERFERERS

(75) Inventors: Prasanna Desai, Olivenhain, CA (US); Sven Jerlhagen, Jarfalla (SE); Brima Ibrahim, Aliso Viejo, CA (US); Siukai Mak, Poway, CA (US); Asif Grushkevich, LaSolla, CA (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 677 days.

(21) Appl. No.: 13/206,035

(22) Filed: Aug. 9, 2011

(65) Prior Publication Data

US 2011/0294432 A1 Dec. 1, 2011

Related U.S. Application Data (63) Continuation of application No. 11/682,052, filed on Mar. 5, 2007, now Pat. No. 7,995,687.

(51) Int. Cl.

| | |
|---|---|
| H03D 1/04 | (2006.01) |
| H03K 5/01 | (2006.01) |
| H03D 1/06 | (2006.01) |
| H03K 6/04 | (2006.01) |
| H04B 1/10 | (2006.01) |
| H04B 1/715 | (2011.01) |
| H04W 28/04 | (2009.01) |
| H04W 84/18 | (2009.01) |

(52) U.S. Cl.
CPC ........ *H04B 1/715* (2013.01); *H04B 2001/7154* (2013.01); *H04W 28/04* (2013.01); *H04W 84/18* (2013.01)

USPC .......................................... 375/346; 375/316

(58) Field of Classification Search
USPC .......................................................... 375/346
See application file for complete search history.

(56) References Cited

U.S. PATENT DOCUMENTS

| | | | |
|---|---|---|---|
| 6,636,738 B1 | 10/2003 | Hayashi | |
| 2003/0188028 A1* | 10/2003 | Kawamura | 709/249 |
| 2005/0005227 A1* | 1/2005 | Felbecker et al. | 714/776 |
| 2005/0020271 A1 | 1/2005 | Fukuda et al. | |
| 2007/0121946 A1* | 5/2007 | Ito et al. | 380/270 |
| 2008/0101279 A1 | 5/2008 | Russell et al. | |
| 2008/0180825 A1 | 7/2008 | Erden et al. | |
| 2009/0185601 A1 | 7/2009 | Felbecker et al. | |
| 2013/0004002 A1* | 1/2013 | Duchscher et al. | 381/315 |

* cited by examiner

*Primary Examiner* — Erin File
(74) *Attorney, Agent, or Firm* — McDermott Will & Emery LLP (57) ABSTRACT

A method for frequency selection in a wireless communication system, includes performing in a wireless device, receiving at least one signal at a current frequency; processing at least one data packet received via the received at least one signal to determine the presence of bit errors; characterizing the received at least one signal received at the current frequency based on the processing of the at least one data packet; classifying the current frequency based on at least the characterization of the received at least one signal; and selecting the current frequency based on the classification. At least one signal strength measurement may be performed on the received at least one signal, and the processing of the at least one data packet may be performed within a current channel classification update interval.

68 Claims, 4 Drawing Sheets

FAST AND RELIABLE CHANNEL CLASSIFICATION ALGORITHMS IN BLUETOOTH NETWORKS TO DETECT AND AVOID 2.4 GHZ INTERFERERS

CROSS-REFERENCE TO RELATED APPLICATIONS/INCORPORATION BY REFERENCE

This application is a continuation of U.S. application Ser. No. 11/682,052 filed Mar. 5, 2007, now issued as U.S. Pat. No. 7,995,687 which is hereby incorporated by reference in its entirety for all purposes.

FIELD OF THE INVENTION

Certain embodiments of the invention relate to Bluetooth wireless communications. More specifically, certain embodiments of the invention relate to a method and system for fast and reliable channel classification in Bluetooth networks to detect and avoid channel interferers.

BACKGROUND OF THE INVENTION

Bluetooth is a short range wireless communications capability that enables connection between consumer and computer equipment while eliminating wires. Equipment that is enabled to utilize Bluetooth technology may be referred to as Bluetooth devices. Bluetooth devices within a range of approximately 10 meters of each other may communicate utilizing a 2.4 gigahertz (GHz) frequency spectrum in the Industrial, Scientific and Medical (ISM) frequency band. The Bluetooth frequency spectrum comprises a range of frequencies from 2.4 GHz to 2.4835 GHz. The 2.4 GHz frequency spectrum comprises a set of 79 channels, each channel separated by 1 megahertz (MHz). The lowest frequency channel is 2.402 GHz, and the highest frequency channel is 2.48 GHz.

Examples of Bluetooth devices may comprise personal digital assistants (PDA), headsets, telephones, home audio equipment, and computers. Capabilities enabled by Bluetooth technology may comprise eliminating cables linking computers to printers, keyboards, and mouse devices, making calls from a wireless headset connected via wireless link to a wired or wireless telephone, and the playing of audio from a portable MP3 player via a home audiovisual system with no wired connection between the MP3 player and the home audiovisual system.

Bluetooth is designed to enable a plurality of Bluetooth devices to operate in a personal area network (PAN) environment. The plurality of Bluetooth devices in an environment may comprise a network known as a piconet. Within the approximately 10 meter range of Bluetooth technology a plurality of piconets may exist. Thus, Bluetooth technology may enable a plurality of piconets to coexisting within a home environment. For example, a first piconet may comprise computer equipment in a home environment, a second piconet may comprise audiovisual equipment in a home environment, a third piconet may comprise appliances in the home environment such as air conditioners, ovens, and lighting, and so forth.

Bluetooth devices communicate by utilizing frequency hopping spread spectrum (FHSS) techniques. FHSS enables data, represented as a sequence of packets, to be transmitted in such manner that the portion of data contained each packet is modulated by a frequency carrier selected from a group of available channels within the 2.4 GHz Bluetooth frequency spectrum. The ordered sequence in which channels are selected is referred to as a frequency hop sequence. Bluetooth devices in a piconet share a common frequency hop sequence. A primary Bluetooth device, serving in a supervisory role in the piconet, establishes the common frequency hop sequence to be utilized within the piconet. Auxiliary Bluetooth devices, serving in subordinate roles in the piconet, utilize the common frequency hope sequence established by the primary Bluetooth device.

For a given Bluetooth device, the integrity of data transmitted in signals may be comprised if the data is transmitted via a channel that is current being utilized. For example, a given channel may be utilized by another Bluetooth device. In addition, wireless local area network (WLAN) stations also use the 2.4 GHz frequency spectrum. From the perspective of a specific Bluetooth device that is currently transmitting data via a specific channel, other Bluetooth devices, and WLAN stations that are currently transmitting data via the same channel are referred to as "interferers".

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for fast and reliable channel classification in Bluetooth networks to detect and avoid channel interferers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for fast and reliable channel classification in Bluetooth networks to detect and avoid channel interferers. In various embodiments of the invention, a Bluetooth device may generate a channel map by utilizing a combination of active and passive channel assessment methods. The active channel assessment method enables classification of an RF channel that may not currently be in use. The passive channel assessment method enables classification of an RF channel that is currently in use by the Bluetooth device. The active channel assessment method may comprise performing received signal strength indication (RSSI) measurements on an RF channel that may not currently be in use. Based on the RSSI measurement, the measured RF channel may be classified as being Good or Bad. If the measured RF channel is classified as being Bad, and is currently referenced in the channel map, the measured RF channel may be removed from the channel map. If the measured RF channel is classified as being Good, and is currently not referenced in the channel map, the measured RF channel may be added to the channel map.

The passive channel assessment method may comprise performing RSSI measurements on an RF channel that is currently in use when there are opportunities to do so, for example during time instants when data is not being received. In addition, packets received via the in use channel may be evaluated to detect bit errors in the data contained within the packets. Based on the RSSI measurement and the bit error assessments of received packets, the in use RF channel may be classified as Good or Bad. If the in use RF channel is classified as Bad, the channel may be removed from the channel map. In various embodiments of the invention, "binning" and "blanking" methods may be utilized to enable removal of a plurality of RF channels from the channel map when a single RF channel is classified as being Bad.

Figure 1:
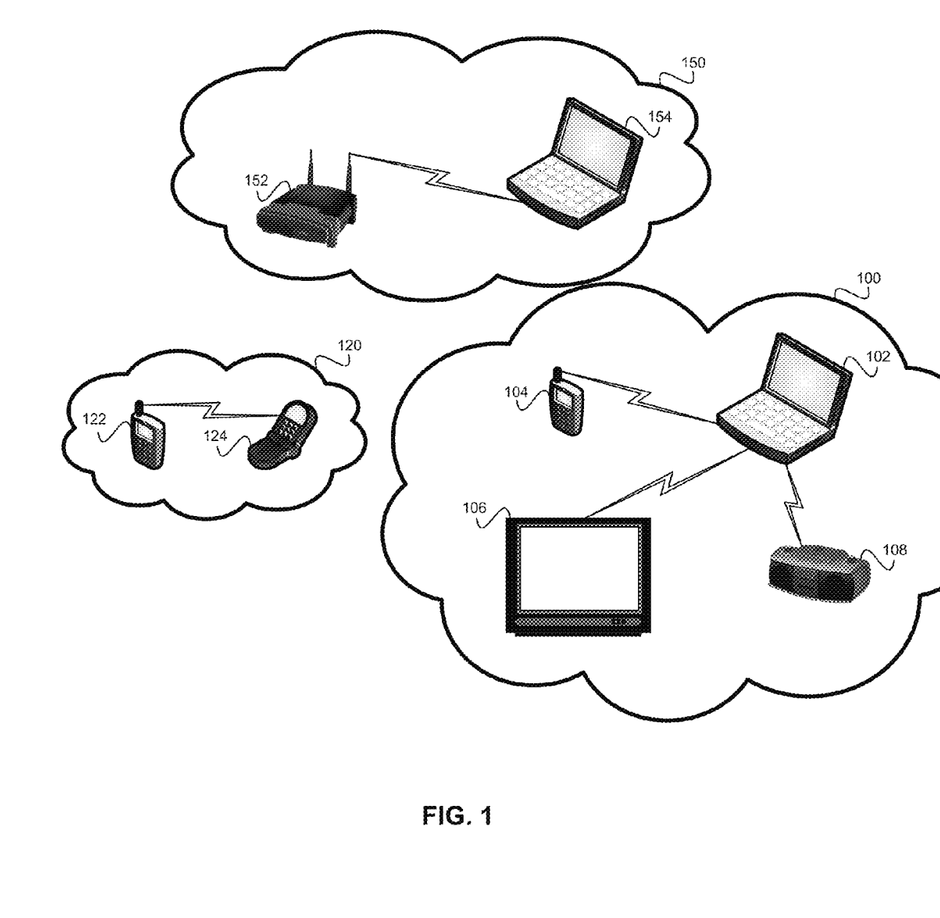
FIG. 1 is a block diagram of an exemplary Bluetooth piconet, which may e utilized in connection with an embodiment of the invention.

FIG. 1 is a block diagram of an exemplary Bluetooth piconet, which may be utilized in connection with an embodiment of the invention. Referring to FIG. 1, there is shown a piconet 100, a piconet 120, and a wireless local area network (WLAN) 150. In various embodiments of the invention, the piconet 100 may comprise an adapted piconet, which is capable of supporting adaptive frequency hopping (AFH). The piconet 100 may comprise a primary Bluetooth device 102, and a plurality of auxiliary Bluetooth devices 104, 106 and 108. An exemplary primary Bluetooth device 102 shown in FIG. 1 is a computer 102. An exemplary auxiliary Bluetooth device 104 shown in FIG. 1 is a Smartphone. An exemplary auxiliary Bluetooth device 106 shown in FIG. 1 is a television set. An exemplary auxiliary Bluetooth device 108 shown in FIG. 1 is a radio. In various embodiments of the invention, the primary Bluetooth device and one or more auxiliary Bluetooth devices may be capable of supporting AFH. The piconet 120 may comprise a plurality of Bluetooth devices 122, and 124. An exemplary Bluetooth device 122 shown in FIG. 1 is a smart phone. An exemplary Bluetooth device 124 shown in FIG. 1 is a wireless telephone. The WLAN 150 may comprise a plurality of WLAN stations 152 and 154, which communicate according to relevant WLAN specifications, such as is set forth in IEEE 802.11, for example. An exemplary WLAN station 152 shown in FIG. 1 is an access point (AP). An exemplary WLAN station 154 shown in FIG. 1 is a computer.

In various embodiments of the invention, each of the auxiliary Bluetooth devices 104, 106 and 108 may utilize passive channel assessment methods to classify the RF channels utilized for communicating with the primary Bluetooth device 102. In addition, each of the auxiliary Bluetooth devices 104, 106 and 108 may utilize active channel assessment methods to classify RF channels, which are not currently being utilized for communicating with the primary Bluetooth device 102. Each of the auxiliary Bluetooth devices 104, 106 and 108 may generate a channel classification report, which comprises classification results for each of the RF channels assessed during active and/or passive channel assessment. Each of the auxiliary Bluetooth devices 104, 106 and 108 may communicate the channel classification report to the primary Bluetooth device 102.

Similarly, the primary Bluetooth device 102 may utilize passive channel assessment methods to classify the RF channels utilized for communicating with each of the auxiliary Bluetooth devices 104, 106 and 108. The primary Bluetooth device 102 may also utilize active channel assessment methods to classify RF channels, which are not currently being utilized for communicating with one or more of the auxiliary Bluetooth devices 104, 106 and 108. In an exemplary embodiment of the invention, the primary Bluetooth device 102 may generate a channel classification report based on the results of the active and passive channel assessment methods performed by the primary Bluetooth device 102. In an alternative exemplary embodiment of the invention, the primary Bluetooth device 102 may combine the results of its active and passive channel assessment methods with the results of the active and passive channel assessment methods performed by one or more of the auxiliary Bluetooth devices 104, 106 and 108.

Since the ISM frequency band is unlicensed frequency spectrum, there is a possibility that Bluetooth devices 102, 104, 106 and/or 108 in the piconet 100 may simultaneously utilize an RF channel that is also being utilized by Bluetooth devices 122 and 124 in the piconet 120, and/or by WLAN stations 152 and 154 in the WLAN 150. From the perspective of Bluetooth devices 102, 104, 106 and/or 108, Bluetooth devices 122 and 124, and/or WLAN stations 152 and 154 may be referred to as interferers. In various embodiments of the invention, RF channels, for which use by interferers is detected, may be removed from the channel map utilized in the piconet 100.

Figure 2:
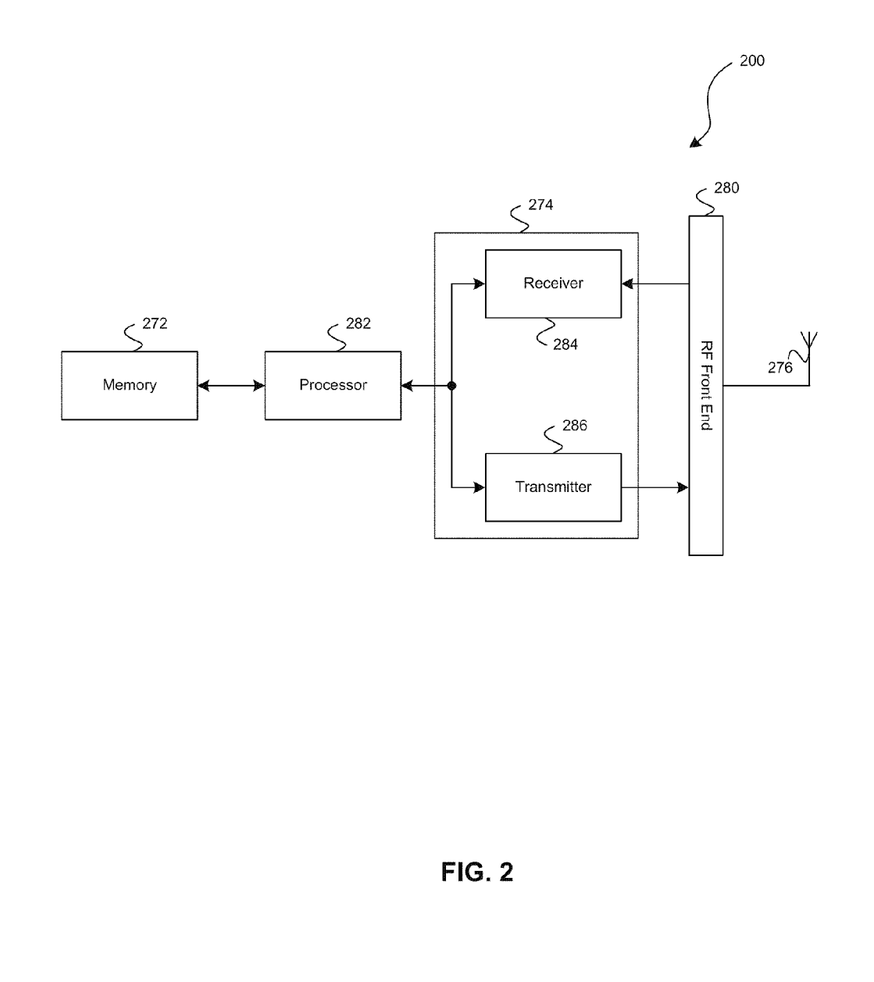
FIG. 2 is a block diagram of an exemplary wireless communication system, which may be utilized in connection with an embodiment of the invention.

FIG. 2 is a block diagram of an exemplary wireless communication system, which may be utilized in connection with an embodiment of the invention. Referring to FIG. 2, there is shown a wireless communication system 200. The wireless communication system 200 may represent a Bluetooth device, and/or a WLAN station as shown in FIG. 1. The wireless communication system 200 may comprise a processor 282, a memory 272, a transceiver 274, an RF front end 208, and an antenna 276. The transceiver 274 may comprise a receiver 284, and a transmitter 286.

In the context of the present application, the processor 282 may enable digital receiver and/or transmitter functions in accordance with applicable communications standards. In addition, the processor 282 may enable the performance of active and/or passive channel assessment methods, the generation of channel classification reports, the communication of the generated channel classification reports from an auxiliary Bluetooth device to a primary Bluetooth device, the generation and/or modification of channel maps, and the selection of RF channels based on adaptive frequency hopping (AFH), for example.

The memory 270 may comprise suitable logic, circuitry and/or code that may enable storage and/or retrieval of data and/or code. The memory may utilize any of a plurality of storage medium technologies, such as volatile memory, for example random access memory (RAM), and/or non-volatile memory, for example electrically erasable programmable read only memory (EEPROM). In the context of the present application, the memory 270 may enable storage of code that enables performance of active and/or passive channel assessment methods, the storage of data contained in channel classification reports, and the storage of data contained in channel maps, for example.

The receiver 284 may perform digital receiver functions that may comprise, but are not limited to, generation of frequency carrier signals corresponding to selected RF channels, the demodulation of received RF signals by the generated frequency carrier signals, and the detection of data. The data may be communicated to the processor 282, which may delineate packet boundaries, and compute packet error rate statistics indicative of the presence or absence of detected bit errors in received packets.

The transmitter 286 may perform digital transmitter functions that may comprise, but are not limited to, generation of frequency carrier signals corresponding to selected RF channels, the modulation of data by the generated frequency carrier signals, and the generation of produce RF signals. The data may be received from the processor 282.

The RF front end 280 may provide amplification of signals received from the transmitter 286 and enable transmission of the amplified RF signal via the antenna 276. The RF front end 280 may also provide amplification and/or filtering of signals received from the antenna 276. The filtered and/or amplified RF signal may then be communicated to the receiver 284.

In various embodiments of the invention the transceiver 274 may be replaced by separate receiver and transmitter blocks. In addition, the wireless communication system 200 may comprise a plurality of antennas 276. For example, in an exemplary embodiment of the invention, the wireless communication systems 200 may comprise one or more antennas adapted for transmitting signals, and one or more antennas adapted for receiving signals.

Figure 3:
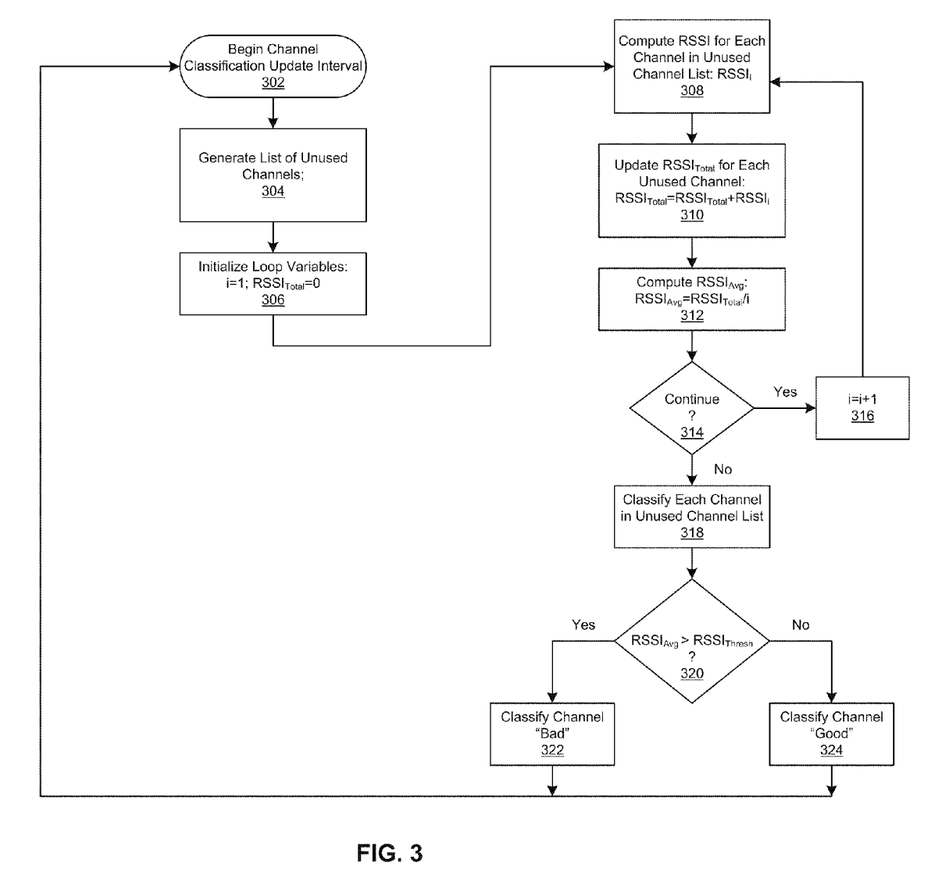
FIG. 3 is a flowchart illustrating an exemplary method for active channel assessment, in accordance with an embodiment of the invention.

FIG. 3 is a flowchart illustrating an exemplary method for active channel assessment, in accordance with an embodiment of the invention. The active channel assessment method may be utilized at a primary Bluetooth device 102, and/or at an auxiliary Bluetooth device. A Bluetooth device, which may perform an active channel assessment procedure, and/or a passive channel assessment procedure may be referred to as a measuring Bluetooth device. The active channel assessment method may be utilized to classify an RF channel, which is not currently being utilized by the measuring Bluetooth device for transmitting and/or receiving of data packets.

Referring to FIG. 3, step 302 indicates the beginning of a channel classification update interval. The channel classification update may comprise a procedure by which a channel map may be updated to reflect currently available RF channels. In this regard, the channel map may be referred to as an available channel map. In an exemplary embodiment of the invention, a channel classification update interval may represent a time duration spanning the beginning of a current channel classification procedure, to the beginning of the following channel classification procedure. In various embodiments of the invention, the channel classification update interval may be configurable, for example in an exemplary embodiment of the invention the channel classification update interval may be set to a value of 2 seconds.

In step 304, a list of currently unused RF channels may be generated. The list of unused RF channels may comprise the set of RF channels, which are not currently being utilized for transmitting data packets by the Bluetooth device, which is performing the active channel assessment procedure.

In step 306, loop variables may be initialized. The variable i is an exemplary loop variable, which may be utilized to count the number of RSSI measurements that are performed for each unused RF channel during the current channel classification update interval. The variable $RSSI_{Total}$ is an exemplary loop variable, which may be utilized to maintain a total value among the RSSI measurements that are performed for each unused RF channel during the current channel classification update interval.

In step 308, an RSSI value, $RSSI_i$, may be measured for each unused RF channel in the list of unused RF channels that was generated in step 304. In step 310, the value $RSSI_i$ determined in step 308 may be added to the current value of $RSSI_{Total}$ for each unused RF channel. In step 312, an average RSSI value, $RSSI_{Avg}$, may be computed for each unused RF channel. The value $RSSI_{Avg}$ represents an average RSSI value for each of the i number of RSSI measurements performed during the current channel classification update interval. The value $RSSI_{Avg}$ may be computed for each unused RF channel.

In step 314, a determination may be made as to whether to continue making subsequent RSSI measurements for each unused RF channel in the current channel classification update interval. The time duration for which RSSI measurements may be performed within a current channel classification update interval may be configurable. In various embodiments of the invention the RSSI measurement time duration may be less than or equal to the channel classification update interval. In an exemplary embodiment of the invention, the time duration for which RSSI measurements may be performed, or "dwell time", may comprise about ½ of a time slot within a 1 MHz Bluetooth channel. If, in step 314, it is determined that RSSI measurements are to continue, in step 316, the value for the variable i may be incremented by 1. Step 308 may follow and the procedure of $RSSI_i$ measurement, $RSSI_{Total}$ calculation, and $RSSI_{Avg}$ calculation may continue.

If, in step 314, it may be determined that RSSI measurements are not to continue in the current channel classification update interval, step 318 may begin the process of classifying each RF channel in the list of unused RF channels. In step 320, the current value $RSSI_{Avg}$ may be compared to a threshold RSSI value, $RSSI_{Thresh}$, for each unused RF channel. In various embodiments of the invention, the RSSI threshold value may be configurable and may represent a quantity measure in units of decibels (dB). An average RSSI value for an unused RF channel, which is greater than the threshold RSSI value, may indicate that an interferer is currently utilizing the RF channel. When this is the case, step 322 may indicate that the RF channel is classified as being "Bad". An average RSSI value for an unused RF channel, which may not be greater than the threshold RSSI value, may indicate that the RF channel may be available to the measuring Bluetooth device for subsequent transmission of data packets. When this is the case, step 324 may indicate that the RF channel is classified as being "Good". Step 302 may follow step 322 or step 324 where the process may pause while awaiting the beginning of the next channel classification update interval.

After classifying each of the unused RF channels as being Good or Bad, one or more of the auxiliary Bluetooth devices may generate an available channel map based on the classifications of step 322 and/or 324. The available channel map may be communicated to the primary Bluetooth device 102 by the one or more auxiliary Bluetooth devices.

Figure 4:
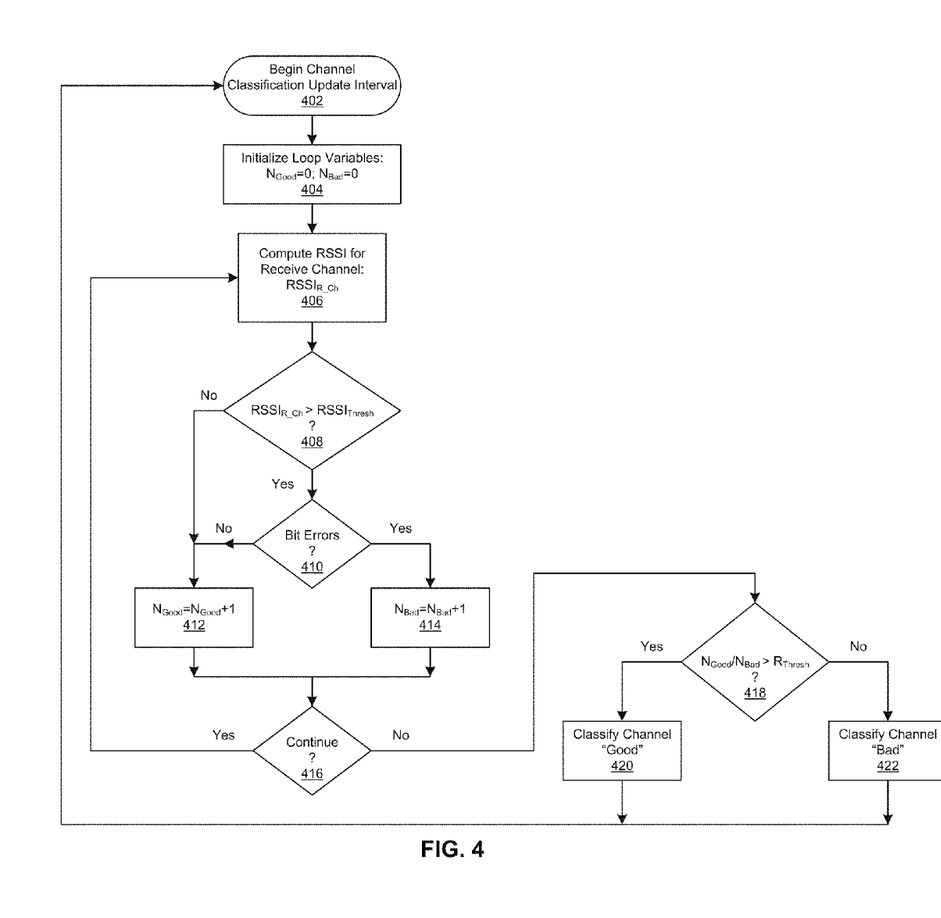
FIG. 4 is a flowchart illustrating an exemplary method for passive channel assessment, in accordance with an embodiment of the invention.

FIG. 4 is a flowchart illustrating an exemplary method for passive channel assessment, in accordance with an embodiment of the invention. The passive channel assessment method may be utilized at a primary Bluetooth device 102, and/or at an auxiliary Bluetooth device. The passive channel assessment method may be utilized to classify an RF channel, which is currently being utilized by the measuring Bluetooth device for transmitting and/or receiving of data packets.

Referring to FIG. 4, step 402 indicates the beginning of a channel classification update interval. The channel classification update may comprise a procedure by which a channel map may be updated to reflect a determination of whether a currently used RF channel is to remain in the available channel map. In various embodiments of the invention, the channel classification update interval may be configurable, for example in an exemplary embodiment of the invention the channel classification update interval may be set to a value of 10 seconds.

In step 404, loop variables may be initialized. The variable $N_{Good}$ is an exemplary loop variable, which may be utilized to count the number of instances, during the current channel classification update interval, for which a currently used RF channel passed "Good" channel criteria. In various embodiments of the invention, examples of Good channel criteria may comprise comparing a measured RSSI value to a threshold RSSI value, $RSSI_{Thresh}$, and detection of 0 bit errors in data packets received via the currently used RF channel. The variable $N_{Bad}$ is an exemplary loop variable, which may be utilized to count the number of instances, during the current channel classification update interval, for which a currently used RF channel did not pass as least one of the "Good" channel criterion.

In step 406, an RSSI value, $RSSI_{R\_Ch}$, may be measured for each currently used RF channel at the measuring Bluetooth device. The RSSI value for the currently used RF channel may be measured during one or more timeslot time intervals for which the measuring Bluetooth device is not currently transmitting data packets. While the measuring Bluetooth device may not be currently transmitting data packets, the device would have not yet relinquished the RF channel. Consequently, the RF channel may still be considered to be "in-use". In step 408, the measured value $RSSI_{R\_Ch}$ may be compared to the threshold RSSI value, $RSSI_{Thresh}$. In various embodiments of the invention, the RSSI threshold value may be configurable as described for FIG. 3 above. A measured RSSI value for a currently used RF channel, which may not be greater than the threshold RSSI value, may indicate that no interferer, which is also currently utilizing the RF channel, has been detected. When this is the case, in step 412, the variable $N_{Good}$ may be incremented. In an exemplary embodiment of the invention, the variable $N_{Good}$ may be incremented by 1 as shown in FIG. 4.

A measured RSSI value for a currently used RF channel, which is greater than the threshold RSSI value, may indicate detection of an interferer, which is also currently utilizing the RF channel. When this is the case, in step 410, a data packet received via the used RF channel may be inspected to determine the presence of one or more detected bit errors in the received data packet. Various methods may be utilized for detection of bit errors, for example forward error correcting (FEC) codes comprising inner codes, such as binary convolutional coding (BCC) may be utilized, and/or outer codes, such as cyclical redundancy checking (CRC) or Reed-Solomon coding, may be utilized. If no bit errors are detected in step 410, step 412 may follow step 410. If bit errors are detected in step 410, in step 414, the variable $N_{Bad}$ may be incremented. In an exemplary embodiment of the invention, the variable $N_{Bad}$ may be incremented by 1 as shown in FIG. 4.

In step 416, a determination is made as to whether to continue making subsequent RSSI measurements for each currently used RF channel in the current channel classification update interval. The time duration for which RSSI measurements may be performed within a current channel classification update interval may be configurable. In various embodiments of the invention the RSSI measurement time duration may be less than or equal to the channel classification update interval. If, in step 416, it is determined that RSSI measurements are to continue, in step 406 may follow and the procedure of $RSSI_{R\_Ch}$ measurement, $RSSI_{Thresh}$ comparison, and possible bit error detection in received data packets may continue.

If, in step 416, it is determined that RSSI measurements are not to continue in the current channel classification update interval, in step 418, the ratio $N_{Good}/N_{Bad}$ may be compared to a threshold ratio, $R_{Thresh}$, for each currently used RF channel. In various embodiments of the invention, the ratio $N_{Good}/N_{Bad}$ may provide an indication of the rate at which each currently used RF channel passed Good channel criteria during the current channel classification update interval. When the ratio $N_{Good}/N_{Bad}$ exceeds the threshold ratio, it may indicate that the currently used RF channel is not subjected to significant interference from interferers. When this is the case, step 420 may indicate that the currently used RF channel is classified as Good.

In instance when the ratio $N_{Good}/N_{Bad}$ does not exceed the threshold ratio, it may indicate that the currently used RF channel is subjected to significant interference from interferers. The interference may result in unacceptably high measured RSSI values and in unacceptably high rates of detected bit errors in received packets, or packet error rate (PER). When this is the case, step 422 may indicate that the currently used RF channel is classified as being Bad. Step 402 may follow either step 422 or step 424 where the process may pause while awaiting the beginning of the next channel classification update interval.

After classifying each of the currently used RF channel as being Good or Bad, one or more of the auxiliary Bluetooth devices may generate an available channel map based on the classifications of step 422 and/or step 424, and/or of step 322 and/or 324 (FIG. 3). The available channel map may be communicated to the primary Bluetooth device 102 by the one or more auxiliary Bluetooth devices.

In some instance, the nature of the traffic carried via a currently used RF channel may limit the number of opportunities for performing passive channel assessment. In this case, the active channel assessment method, as described in FIG. 3, may also be performed for the currently used RF channel. In this regard, the currently used RF channel may be classified based on the results of active channel assessment and/or passive channel assessment methods. In an exemplary embodiment of the invention, a currently used RF channel may be classified as being Bad if either the active channel assessment method or the passive channel assessment method classifies the currently used RF channel as being Bad.

In various embodiments of the invention, the primary Bluetooth device 102 may classify individual RF channels as being Good or Bad based on its own channel assessment, and/or based on channel assessments communicated by one or more auxiliary Bluetooth devices. In an exemplary embodiment of the invention, the primary Bluetooth device 102 may compute a weighted channel assessment as set forth in the following equation:

$$Q_j = \frac{P_j + \sum_{i=1}^{N_A} [\alpha \cdot P_j + (1-\alpha) \cdot A_{ij}]}{1 + N_A} \quad [1]$$

where $Q_j$ represents a weighted classification of RF channel j, $P_j$ represents the classification of RF channel j performed by the primary Bluetooth device utilizing active and/or passive channel assessment procedures, $A_{ij}$ represents the classification of RF channel j performed by the $i^{th}$ auxiliary Bluetooth device, $N_A$ represents the number of auxiliary Bluetooth devices in the piconet 100, and $\alpha$ represents a weighting factor. The weighting factor provides a measure of the influence of the value $P_j$ in computing the weighted classification $Q_j$. For example, when $\alpha=1$, $Q_j=P_j$, and when $\alpha=0$, the primary Bluetooth device and each of the auxiliary Bluetooth devices contribute with equal weight in the computation of the weighted classification value $Q_j$. In an exemplary embodiment of the invention, for each of the classification variables $P_j$, $A_{ij}$, and $Q_j$, a value of 0 may indicate a Bad classification, while a value 1 may indicate a Good classification. In an exemplary embodiment of the invention, numerical rounding may be utilized such that the value $Q_j$ is rounded to the nearest integer value. For example, for values $Q_j<0.5$ computed according to equation [1], the rounded value may be $Q=0$, while for $Q_j\geq 0.5$, the rounded value may be $Q_j=1$.

In various embodiments of the invention, the primary Bluetooth device 102 may compute values $Q_j$ for each of the RF channels utilized in Bluetooth communications, as set forth in equation [1], and an updated available channel map generated based on these computations. The updated available channel map may be subsequently utilized for AFH during Bluetooth communications within a piconet 100.

Various embodiments of the invention may also utilize methods referred to for purposes of the present application as "binning", and "blanking". The binning method may comprise a procedure by which a plurality of associated RF channels may be classified as being Bad if a separate RF channel is classified as being Bad. In an exemplary embodiment of the invention, if a given RF channel is classified as being Bad, the preceding RF channel and the succeeding RF channel may also be classified as being Bad. In this case, the bin size would be 3 MHz, given 1 MHz RF channels.

In various embodiments of the invention, the bin size, or the number of associated RF channels, which are classified as being Bad based on a separate RF channel being classified as being Bad may be configurable. In addition, the relationship between the separate RF channel being classified as Bad, and the one or more associated RF channels being classified as Bad as a result may be configurable (for example, the set of RF channels classified as being Bad may not comprise a contiguous block of frequencies).

The blanking method may also comprise a procedure by which a plurality of associated RF channels may be classified as being Bad if a separate RF channel is classified as being Bad. In this case, however, the relationship between the separate RF channel and associated RF channels may be based on a WLAN channel. In an exemplary WLAN, a single WLAN channel may comprise 21 MHz, wherein the frequency band occupancy of the WLAN channel may comprise a range of +/−10 MHz around a center frequency. In an exemplary embodiment of the invention, when 5 individual Bluetooth RF channels are classified as being Bad, which fall within the frequency range of one of the commonly used WLAN channels CH1, CH6, or CH11, a set of Bluetooth RF channels, which fall within the frequency range of the corresponding WLAN channel, may be classified as being Bad. When 10 individual Bluetooth RF channels are classified as being Bad, which fall within the frequency range of one of the other WLAN channels, a set of Bluetooth RF channels, which fall within the frequency range of the corresponding WLAN channel may be classified as being Bad.

In various embodiments of the invention, the threshold for number of Bluetooth RF channels classified as being Bad within the frequency range of a single WLAN channel that may result in blanking, or classification of the set of Bluetooth RF channels as being Bad, which fall within the frequency range of the single WLAN channel, may be configurable. In various embodiments of the invention, blanking may not be limited to the frequency range of WLAN channels but may be applied in various foreseeable wireless communications settings. The invention may not be limited to Bluetooth devices, but may be practiced within a wide range of foreseeable wireless communications setting utilizing suitable wireless communication devices. In various embodiments of the invention, an available channel map generated based on active and/or passive channel assessment methods by the primary and/or auxiliary Bluetooth devices may be modified based on binning and/or blanking as set forth above.

Aspects of a method and system for fast and reliable channel classification in Bluetooth networks to detect and avoid channel interferers may comprise one or more processors 282 that may enable performance of signal strength measurements on received Bluetooth signals at a current selected frequency. At least one data packet received via the Bluetooth signals may be processed to determine the presence of bit errors. The processors 282 may enable characterization of the Bluetooth signals at the current selected frequency based on the signal strength measurements and/or the processing of the data packets. The current selected frequency may be selected during adaptive frequency hopping at a subsequent time based on the characterization.

The signal strength measurements and/or processing of the data packets may be performed within a current channel classification update interval. The processor 282 may enable a signal clear count to be maintained to count the number of instances during the current channel classification update interval during which the signal strength measurement is less than or equal to a threshold value. The data packet processing may occur when the signal strength measurement is greater than the threshold value. The processor 282 may enable a signal interference count to be maintained to count the number of instances during which a bit error is detected in the processed data packets for each instance when the signal strength measurement is greater than the threshold value.

The processor 282 may enable the characterization to be performed by comparing a ratio of the signal clear count, and the signal interference count, to a threshold ratio. The characterization may determine whether the received Bluetooth signal is Good or Bad based on the comparison. The processor 282 may enable selection of the current selected frequency at the subsequent time when the received Bluetooth signal is characterized as being Good.

The processor 282 may enable removal of the current selected frequency from an available channel map when the receive Bluetooth signal is characterized as being Bad. The processor 282 may enable generation of an updated available channel map based on the available channel map, and at least one received auxiliary channel map. The auxiliary channel maps may be received by a primary Bluetooth device 102, for one or more auxiliary Bluetooth devices 104, 106 and/or 108 within a piconet 100. The processor 282 may enable selection of a weighting factor, a, for generation of the updated available channel map. The processor 282 may enable removal of one or more frequencies other than the current selected frequency from the available channel map.

The processor 282 may enable signal strength measurements performed at frequencies other than the current selected frequency. The processor 282 may enable performance of the signal strength measurements within a current channel classification update interval. An average value for the signal strength measurements may be computed during the current channel classification update interval. The average value may be compared to a threshold value. The processor 282 may enable removal of the other than current selected frequency from the available channel map based on the comparison.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for frequency selection in a wireless communication system, the method comprising:
   in a wireless device:
      receiving at least one signal at a current frequency;
      processing at least one data packet received via said received at least one signal to determine a presence of bit errors;
      classifying said current frequency based on at least said processing of said at least one data packet and at least one signal strength measurement of said at least one signal received at the current frequency; and
      selecting said current frequency based on said classification.

2. The method according to claim 1, comprising performing:
   said at least one signal strength measurement on said received at least one signal; and
   said processing of said at least one data packet within a current channel classification update interval.

3. The method according to claim 2, comprising maintaining a signal clear count of a number of instances during said current channel classification update interval wherein a value of said at least one signal strength measurement is less than or equal to a threshold value.

4. The method according to claim 3, comprising performing said processing of said at least one data packet for each of said value of said at least one signal strength measurement that is greater than said threshold value.

5. The method according to claim 4, comprising maintaining a signal interference count of a number of instances wherein at least one bit error is detected in said processed at least one data packet for each of said value of said at least one signal strength measurement that is greater than said threshold value.

6. The method according to claim 5, comprising performing said classifying by comparing a ratio of said signal clear count and said signal interference count to a threshold ratio.

7. The method according to claim 6, wherein said classifying determines whether said current frequency is Good or Bad based on said comparing.

8. The method according to claim 7, comprising selecting said current frequency when said received at least one signal is Good.

9. The method according to claim 6, comprising removing said current frequency from an available channel map when said received at least one signal is Bad.

10. The method according to claim 9, comprising generating an updated available channel map based on said available channel map and at least one received auxiliary available channel map.

11. The method according to claim 10, comprising selecting a weighting factor for said generating said updated available channel map.

12. The method according to claim 9, comprising removing at least one frequency, other than said current selected frequency, from said available channel map.

13. The method according to claim 1, comprising performing said at least one signal strength measurement at a frequency other than said current frequency.

14. The method according to claim 13, comprising performing said at least one signal strength measurement within a current channel classification update interval.

15. The method according to claim 14, comprising computing an average value for said at least one signal strength measurement during said current channel classification update interval.

16. The method according to claim 15, comprising comparing said average value to a threshold value.

17. The method according to claim 16, comprising removing said frequency, other than said current frequency, from an available channel map based on said comparing.

18. A system for frequency selection in a wireless communication system, the system comprising:
   at least one processor to be utilized in a wireless device, said at least one processor enables:
      receiving at least one signal at a current frequency;
      processing at least one data packet received via said received at least one signal to determine a presence of bit errors;
      classifying said current frequency based on at least said processing of said at least one data packet and at least one signal strength measurement of said received at least one signal; and
      selecting said current frequency based on said classification.

19. The system according to claim 18, wherein said at least one processor enables performing:
   said at least one signal strength measurement on said received at least one signal; and
   said processing of said at least one data packet within a current channel classification update interval.

20. The system according to claim 19, wherein said at least one processor enables maintaining a signal clear count of a number of instances during said current channel classification update interval wherein a value of said at least one signal strength measurement is less than or equal to a threshold value.

21. The system according to claim 20, wherein said at least one processor enables performing said processing of said at least one data packet for each of said value of said at least one signal strength measurement that is greater than said threshold value.

22. The system according to claim 21, wherein said at least one processor enables maintaining a signal interference count of a number of instances wherein at least one bit error is detected in said processed at least one data packet for each of said value of said at least one signal strength measurement that is greater than said threshold value.

23. The system according to claim 22, wherein said at least one processor enables performing said classifying by comparing a ratio of said signal clear count and said signal interference count to a threshold ratio.

24. The system according to claim 23, wherein said classifying determines whether said current frequency is Good or Bad based on said comparing.

25. The system according to claim 24, wherein said at least one processor enables selecting said current frequency when said received at least one signal is Good.

26. The system according to claim 24, wherein said at least one processor enables removing said current frequency from an available channel map when said received at least one signal is Bad.

27. The system according to claim 26, wherein said at least one processor enables generating an updated available channel map based on said available channel map and at least one received auxiliary available channel map.

28. The system according to claim 27, wherein said at least one processor enables selecting a weighting factor for said generating said updated available channel map.

29. The system according to claim 26, wherein said at least one processor enables removing at least one frequency, other than said current selected frequency, from said available channel map.

30. The system according to claim 19, wherein said at least one processor enables performing said at least one signal strength measurement at a frequency other than said current frequency.

31. The system according to claim 30, wherein said at least one processor enables performing said at least one signal strength measurement within a current channel classification update interval.

32. The system according to claim 31, wherein said at least one processor enables computing an average value for said at least one signal strength measurement during said current channel classification update interval.

33. The system according to claim 32, wherein said at least one processor enables comparing said average value to a threshold value.

34. The system according to claim 33, wherein said at least one processor enables removing said frequency, other than said current frequency, from an available channel map based on said comparing.

35. A method for frequency selection in a wireless communication system, the method comprising:
in a wireless device:
performing at least one signal strength measurement on a corresponding at least one signal received at a current frequency;
classifying said current frequency based on at least said at least one signal strength measurement and a presence of bit errors in at least one data packet received via said received at least one signal; and
selecting said current frequency based on said classification.

36. The method according to claim 35, comprising performing:
said at least one signal strength measurement; and
processing said at least one data packet received via said received at least one signal to determine the presence of said bit errors, wherein said performing is done within a current channel classification update interval.

37. The method according to claim 36, comprising maintaining a signal clear count of a number of instances during said current channel classification update interval wherein a value of said at least one signal strength measurement is less than or equal to a threshold value.

38. The method according to claim 37, comprising performing said processing of said at least one data packet for each of said value of said at least one signal strength measurement that is greater than said threshold value.

39. The method according to claim 38, comprising maintaining a signal interference count of a number of instances wherein at least one bit error is detected in said processed at least one data packet for each of said value of said at least one signal strength measurement that is greater than said threshold value.

40. The method according to claim 39, comprising performing said classifying by comparing a ratio of said signal clear count and said signal interference count to a threshold ratio.

41. The method according to claim 40, wherein said classifying determines whether said current frequency is Good or Bad based on said comparing.

42. The method according to claim 41, comprising selecting said current frequency when said received at least one signal is Good.

43. The method according to claim 41, comprising removing said current frequency from an available channel map when said received at least one signal is Bad.

44. The method according to claim 43, comprising generating an updated available channel map based on said available channel map and at least one received auxiliary available channel map.

45. The method according to claim 44, comprising selecting a weighting factor for said generating said updated available channel map.

46. The method according to claim 43, comprising removing at least one frequency, other than said current selected frequency, from said available channel map.

47. The method according to claim 36, comprising performing said at least one signal strength measurement at a frequency other than said current frequency.

48. The method according to claim 47, comprising performing said at least one signal strength measurement within a current channel classification update interval.

49. The method according to claim 48, comprising computing an average value for said at least one signal strength measurement during said current channel classification update interval.

50. The method according to claim 49, comprising comparing said average value to a threshold value.

51. The method according to claim 50, comprising removing said frequency, other than said current frequency, from an available channel map based on said comparing.

52. A system for frequency selection in a wireless communication system, the system comprising:
at least one processor to be utilized in a wireless device, said at least one processor enables:
performing at least one signal strength measurement on a corresponding at least one signal received at a current frequency;
classifying said current frequency based on at least said at least one signal strength measurement and a presence of bit errors in at least one data packet received via said received at least one signal; and selecting said current frequency based on said classification.

53. The system according to claim 52, wherein said at least one processor enables performing:
said at least one signal strength measurement; and
processing said at least one data packet received via said received at least one signal to determine the presence of said bit errors, wherein said performing is done within a current channel classification update interval.

54. The system according to claim 53, wherein said at least one processor enables maintaining a signal clear count of a number of instances during said current channel classification update interval wherein a value of said at least one signal strength measurement is less than or equal to a threshold value.

55. The system according to claim 54, wherein said at least one processor enables performing said processing of said at least one data packet for each of said value of said at least one signal strength measurement that is greater than said threshold value.

56. The system according to claim 55, wherein said at least one processor enables maintaining a signal interference count of a number of instances wherein at least one bit error is detected in said processed at least one data packet for each of said value of said at least one signal strength measurement that is greater than said threshold value.

57. The system according to claim 56, wherein said at least one processor enables performing said classifying by comparing a ratio of said signal clear count and said signal interference count to a threshold ratio.

58. The system according to claim 57, wherein said classifying determines whether said current frequency is Good or Bad based on said comparing.

59. The system according to claim 58, wherein said at least one processor enables selecting said current frequency when said received at least one signal is Good.

60. The system according to claim 58, wherein said at least one processor enables removing said current frequency from an available channel map when said received at least one signal is Bad.

61. The system according to claim 60, wherein said at least one processor enables generating an updated available channel map based on said available channel map and at least one received auxiliary available channel map.

62. The system according to claim 61, wherein said at least one processor enables selecting a weighting factor for said generating said updated available channel map.

63. The system according to claim 60, wherein said at least one processor enables removing at least one frequency, other than said current selected frequency, from said available channel map.

64. The system according to claim 53, wherein said at least one processor enables performing said at least one signal strength measurement at a frequency other than said current frequency.

65. The system according to claim 64, wherein said at least one processor enables performing said at least one signal strength measurement within a current channel classification update interval.

66. The system according to claim 65, wherein said at least one processor enables computing an average value for said at least one signal strength measurement during said current channel classification update interval.

67. The system according to claim 66, wherein said at least one processor enables comparing said average value to a threshold value.

68. The system according to claim 67, wherein said at least one processor enables removing said frequency, other than said current frequency, from an available channel map based on said comparing.

* * * * *